(12) United States Patent
Kikinis et al.

(10) Patent No.: US 6,944,741 B1
(45) Date of Patent: Sep. 13, 2005

(54) METHOD AND SYSTEM FOR IMPLEMENTING AN ELECTRONIC PROGRAM GUIDE USING PARTITIONED MEMORY AND PARTIAL TITLES

(76) Inventors: Dan Kikinis, 20264 Ljepava Dr., Saratoga, CA (US) 95070; Eduard Zaslavsky, 40 Cloverhill Court, Maple, Ontario (CA) L6A 3C9

( * ) Notice: Subject to any disclaimer, the term of this patent is extended or adjusted under 35 U.S.C. 154(b) by 485 days.

(21) Appl. No.: 10/157,437

(22) Filed: May 28, 2002

Related U.S. Application Data

(63) Continuation-in-part of application No. 10/071,091, filed on Feb. 7, 2002.
(60) Provisional application No. 60/294,455, filed on May 29, 2001, provisional application No. 60/267,992, filed on Feb. 9, 2001.

(51) Int. Cl.[7] .............................................. G06F 12/00
(52) U.S. Cl. ........................................ 711/173; 725/39
(58) Field of Search ........................... 711/173; 725/39

(56) References Cited

U.S. PATENT DOCUMENTS

| | | | |
|---|---|---|---|
| 6,344,880 B1 * | 2/2002 | Takahashi et al. | 348/563 |
| 6,477,705 B1 * | 11/2002 | Yuen et al. | 725/41 |
| 6,493,876 B1 | 12/2002 | DeFreese et al. | |
| 6,526,579 B2 * | 2/2003 | Sato | 725/58 |
| 2001/0039656 A1 * | 11/2001 | Nakamura et al. | 725/9 |
| 2002/0154892 A1 * | 10/2002 | Hoshen et al. | 386/87 |
| 2003/0067554 A1 * | 4/2003 | Klarfeld et al. | 348/461 |

* cited by examiner

*Primary Examiner*—Kevin Verbrugge
(74) *Attorney, Agent, or Firm*—Todd S. Parkhurst; Holland & Knight LLP

(57) ABSTRACT

In one embodiment, there is provided a method for storing program information in a memory associated with an electronic program guide system. The method comprises partitioning the memory into two areas, wherein a first of said areas is structured to hold records of a first type, each comprising a first subset of information about a program including a partial title therefor, and wherein a second of said areas is structured to hold records of a second type, each comprising a second subset of information about the program; and linking records of the first and second type through a common field.

37 Claims, 11 Drawing Sheets ium. In contrast, EPGs
METHOD AND SYSTEM FOR IMPLEMENTING AN ELECTRONIC PROGRAM GUIDE USING PARTITIONED MEMORY AND PARTIAL TITLES

PRIORITY

This application is a continuation-in-part of application Ser. No. 10/071,091 filed which claims benefit of provisional Application No. 60/267,992, filed Feb. 9, 2001, application Ser. No. 60/294,455 filed on May 29, 2001 and is hereby incorporated by reference.

FIELD OF THE INVENTION

This invention relates to electronic program guides. In particular it relates a method and system for implementing an electronic program guide storing television programming information.

BACKGROUND

Electronic Program Guides (EPGs) for storing program information such as television programming information have several advantages over printed program guides. One advantage is that while printed program guides are difficult to update with last minute program changes and can thus be inaccurate, EPGs may be updated with the latest program changes with relative ease. Another advantage that EPGs have over printed guides is that printed guides tend to be bulky because of the amount of information they contain. This makes them cumbersome to use. In contrast, EPGs have powerful searching capabilities making it easy to locate a desired channel.

In more complex systems, an EPG may provide selected programming information to a videocassette recorder (VCR) to allow the VCR to record a desired channel automatically. In other systems, a television receiver may be turned on and tuned to a desired channel using selected information from the EPG. Because of these advantages EPGs are gaining in popularity. However, one difficulty in implementing an EPG arises from the sheer volume of data that needs to be stored and manipulated. As an example, it is not unusual for an EPG for a satellite television system to have 10,000 distinct events (i.e., a unique combination of show and time). More memory may be added to the EPG to hold the data, but this is an expensive solution. Further, the large volume of the EPG data also means that more processing power is needed to manipulate (search and sort) the data, which also pushes up costs. Thus, there is a need to manage EPG data in an efficient manner to conserve valuable memory and make manipulation of the EPG data more efficient.

To this end, some EPG systems partition and/or compress the EPG data. With partitioning, the EPG data is partitioned into records containing frequently changing information. For example, program event, channel, time, etc. and records containing fields that change relatively infrequently for example, program event, title, program description, etc. The two record types can then be combined through a common field, for example the event field, to provide complete program information. It will be appreciated that by using partitioning the infrequently changing information needs to be stored just once thus leading to a savings of memory space. However, if the EPG data is not only partitioned but also compressed then if too many separate items have to be decompressed, the response may become sluggish and therefore unacceptable.

What is thus needed is a more efficient method of packaging the EPG data in general, and in particular in situations where the information is not only partitioned, but then also compressed.

SUMMARY OF THE INVENTION

According to one aspect of the invention there is provided a system for implementing an electronic program guide. The system comprises input circuitry configured to receive programming information; a processor coupled to the input circuitry; a program memory coupled to the processor to store a preferred program which controls operation of the processor; and a data storage area coupled to the processor, the data storage area being partitioned into a plurality of discrete storage areas, wherein under control of the control program the CPU operates to store programming information received by the input circuitry in the discrete storage areas, each discrete storage area storing programming information that is related in accordance with a predefined criterion.

DETAILED DESCRIPTION

A method and system for implementing an EPG is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
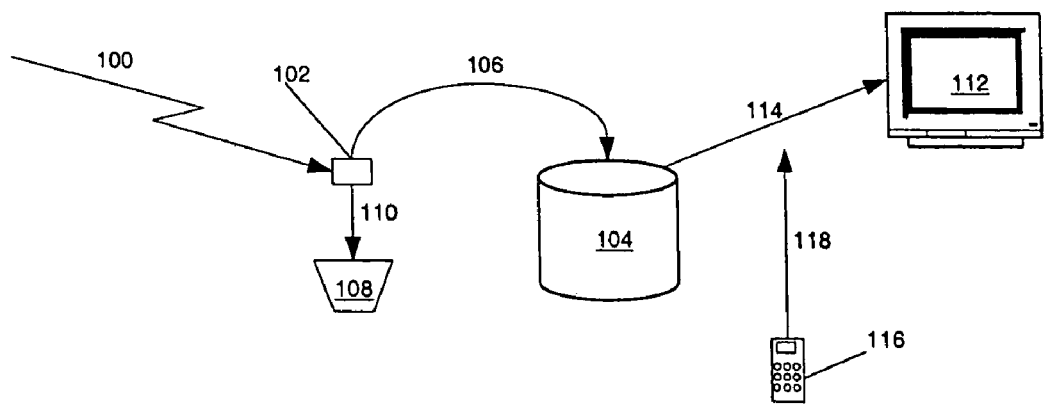
FIG. 1 illustrates a prior art method for implementing an EPG.

FIG. 1 of the drawings shows a prior art method for implementing an EPG. Referring to FIG. 1, an incoming EPG data stream is indicated by reference numeral 100. The EPG data stream 100 is stored in a first storage area 102. Thereafter, a selection process is executed wherein it is decided which components of the incoming EPG data stream 100 are required and which components are not required. The components of the incoming EPG data stream 100 that are required are moved into a second storage area 104 as indicated by arrow 106. Components of the EPG data stream 100 that are not required are moved into a garbage collection area 108 as indicated by arrow 110. Components of the EPG data stream 100 that are stored in the storage area 104 are sent to a display 112 as indicated by arrow 114. Controlling which components to send to display 112 is based on user interaction with a remote controller 116 and activity arrow 118. It will be appreciated that crucial to the prior art method shown in FIG. 1 of the drawings is that a selection process uses certain selection criteria to decide which components of the incoming EPG data stream 100 to store and which components to move into garbage storage area 106. By using this selection process the data that is stored in data storage area 104 can be kept to within certain size limits.

Figure 2:
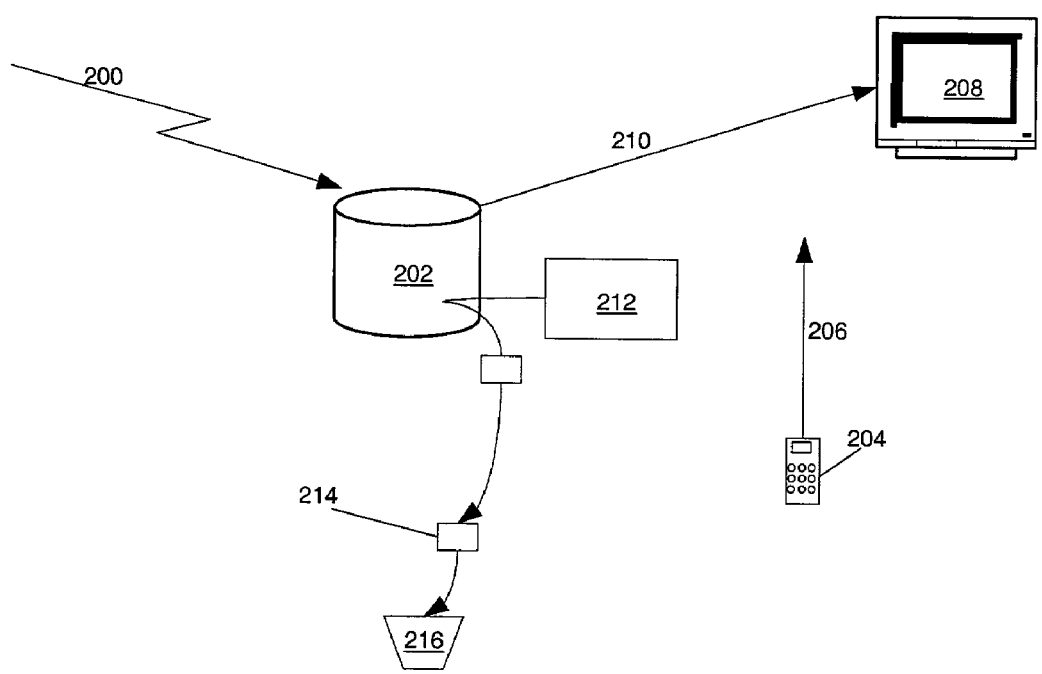
FIG. 2 shows a method for implementing an EPG in accordance with one embodiment of the invention.

As described below, the method and system in accordance with embodiments of the present invention do not require compression of the incoming EPG data stream or a selection of any components thereof. FIG. 2 of the drawings shows a method for implementing an EPG in accordance with one embodiment of the invention. Referring to FIG. 2, an incoming EPG data stream 200 is stored in its entirety in a storage area 202. Thereafter a user can, through input via a remote controller 204 and activity arrow 206, display a selection of data from storage area 202 on a display 208. Arrow 210 indicates the selection being sent to display 208. Process 212 continuously goes through storage area 202 in a cyclical manner, independently of the incoming EPG data stream 200, and removes superfluous or unwanted information by cleaning up storage area 202 as will be described in greater detail below. Part of process 212 includes removing unwanted records 214 from storage area 202 and dumping those records into a garbage collection area 216.

One difference between the embodiment of the invention illustrated in FIG. 2 of the drawings and the prior art illustrated in FIG. 1 of the drawings is that the incoming EPG data stream according to the prior art is first stored in a first storage area and thereafter a decision is made as to whether to store components thereof in a second memory storage area or not, whereas in the embodiment of the invention shown in FIG. 2 of the drawings the entire incoming EPG data stream is stored in a database within storage area 202 and only then, at a later state (after the EPG incoming stream has been stored in database 202) does cyclical process 210 execute to remove superfluous data entries in the database in storage area 202. These superfluous data entries could include, for example, entries that have expired.

Figure 3:
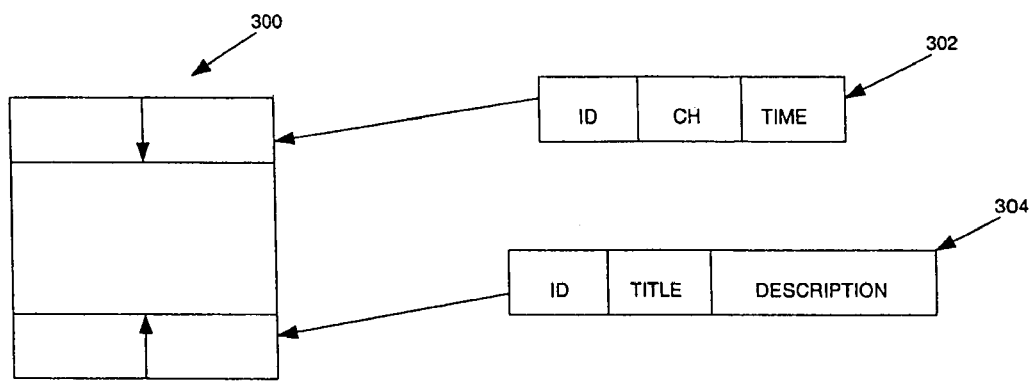
FIG. 3 shows an organizational structure of a memory for storing an EPG in accordance with the prior art.

Referring to FIG. 3 of the drawings, a simplified block diagram showing an internal organization of memory storage area 104 in FIG. 1 of the drawings is indicated generally by reference numeral 300. The organization of data memory 300 includes from the top down one type of record 302 and from the bottom up another type of record 304, or vice versa. Examples of the record types 302 and 304 are also shown in FIG. 3. It will be seen that the record type 302 includes an identification (ID), a channel number, and a time when a show will air, but no title or description. Record type 304 includes an ID, a title, and a description, but no channel number or time. As an example of how these record types are used in the prior art, consider the program ABC news, which occurs every day at 5:00 p.m. and at 7:00 p.m. For every day of the week, record 302 shows the ID, which may be a number; the channel, e.g., channel 7; and a time, e.g., 5:00 p.m. or 7:00 p.m. (and maybe the date or day of the week, etc.). To avoid duplication of information each broadcast time of ABS news is associated with a single record 304. Thus, for example, if one considers upcoming programs within a two-week window there would be 14 entries with a different broadcast time. But all of those records would share only one record 304 which, for example, says "ABC news" and says "evening news" under its title and description respectively. Thus, all 14 shows share one description record. Implicit in being able to implement a memory organizational structure as shown in FIG. 3 of the drawings it is necessary that the data in the incoming EPG data stream in the prior art be presorted into record types 302 and 304.

Figure 4:
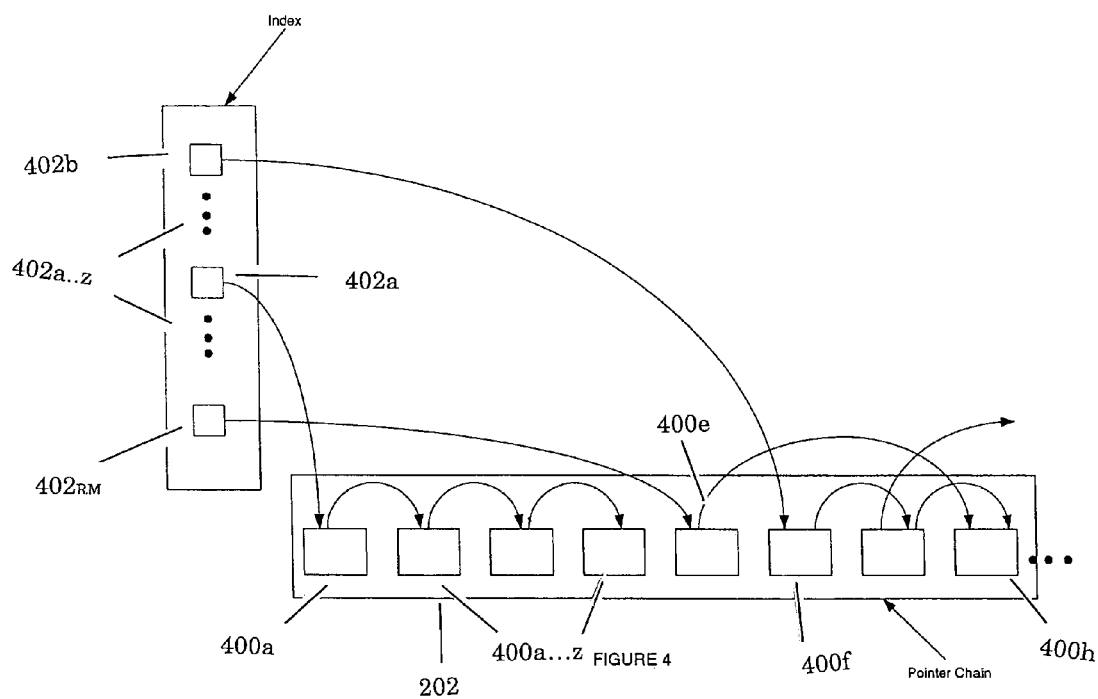
FIG. 4 shows an organizational structure of a memory for storing an EPG in accordance with one embodiment of the invention.

FIG. 4 of the drawings shows one example of a memory organizational structure used to implement an EPG in accordance with one embodiment of the invention. Referring to FIG. 4, memory storage area 202 is divided into a number of discrete storage areas $400_{a..z}$. Discrete storage area $400_e$ is not used to store actual EPG data. Instead discrete storage area $400_e$ points to other storage areas that contain superfluous data or data that is no longer required. It will be seen that the discrete storage areas $400_{a..z}$ form a pointer chain. An index of pointers $402a..z$ is maintained to keep track of the content of the discrete storage areas in the pointer chain. For example, as shown in FIG. 4 of the drawings, the index comprises element $402_a$ which points to discrete storage area $400_a$ which may, for example, store programs which start with the letter "A". Element $402_b$ in the index points to discrete storage area $400_f$ which, for example, contains programs which start with the letter "F" and so on. The index also includes element $402_{RM}$ which points to discrete storage area $400_e$. Incoming EPG data is stored in any one of discrete storage areas $400_{a..z}$ in the pointer chain depending on which of the discrete storage areas are available. For example, as shown in FIG. 4, discrete storage area $400_h$ is available since discrete storage area $400_e$ points to element $400_h$. When the incoming EPG data is received a check is made using element $402_{RM}$ from the index and discrete storage area $400_e$ from the pointer chain to determine which discrete storage area is available for storage. The incoming EPG data is then stored in the next available storage area and the index is updated. By using the index and the pointer chain as illustrated in FIG. 4 there is no need to compress the data in storage area 202 into a table. One advantage of storing or organizing storage area 202 using the organizational structure shown in FIG. 4 of the drawings is that to look for a title with the letter "Z", for example, there is no need to go through the whole pointer chain starting at $400_a$, etc., until you get to the letter "Z". The index of pointers $402a..z$ facilitates rapid access to data within the pointer chain. For example, in FIG. 4 of the drawings, pointer $402_b$ from the index points to discrete storage area $400_f$ in the pointer chain thereby indicating the location of the first program starting with the letter "B". The memory organizational scheme shown in FIG. 4 of the drawings is not limited to only letters. Thus, there may be additional pointer chains for IDs, show times, names, etc., for any structure which requires sorting or searching.

Figure 5:
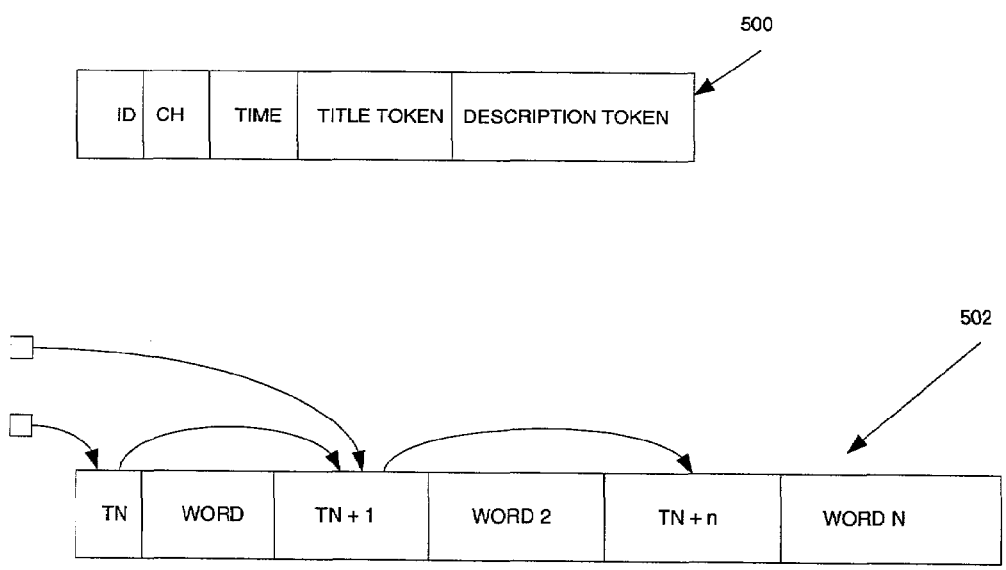
FIG. 5 shows an example of a record type used in accordance with one embodiment of the present invention.

FIG. 5 of the drawings shows examples of records which may be stored in memory storage area 202 in accordance with one embodiment of the invention. Referring to FIG. 5, reference numeral 500 indicates a first type of record which includes ID, channel, time, title, and description fields (date and other additional fields may be present but these are not shown). However, the lengthy fields such as the title and description fields are compressed using tokens. Thus, the full title is represented by a title token and the full description is represented by a description token. A second type of record, indicated by reference numeral 502, provides a token dictionary comprising the meanings of the tokens in record 500. Each token may be associated with a complete or partial word or even multiple words. For example, the word "the" is represented by a token, and instead of requiring three characters, storage of the word "the" requires only a single token. In another example, the word "news" which appears in a great many of today's program titles could be replaced by a single token.

Depending on the preferred size of the dictionary and the number of words included therein, typically one would choose between 8- or 16-bit tokens. If, for example, the 1000 most frequently used words, which comprise up to 95% of the words in program titles and descriptions, is replaced with tokens, the resulting compression then allows the title and description to be included in the same record as the ID, channel, time, etc.

Because the token dictionary is also a table in the database, the dictionary can be modified as the descriptions of programs change by adding new words and removing old words no longer used. Thus, providers at a source or headend could analyze programming descriptions and titles for the next two to three months and update the token dictionary accordingly. In such a case record 500, which is transmitted from the headend, is exactly what is stored in the discrete storage areas $400_{a..z}$ in FIG. 4 of the drawings.

Figure 6:
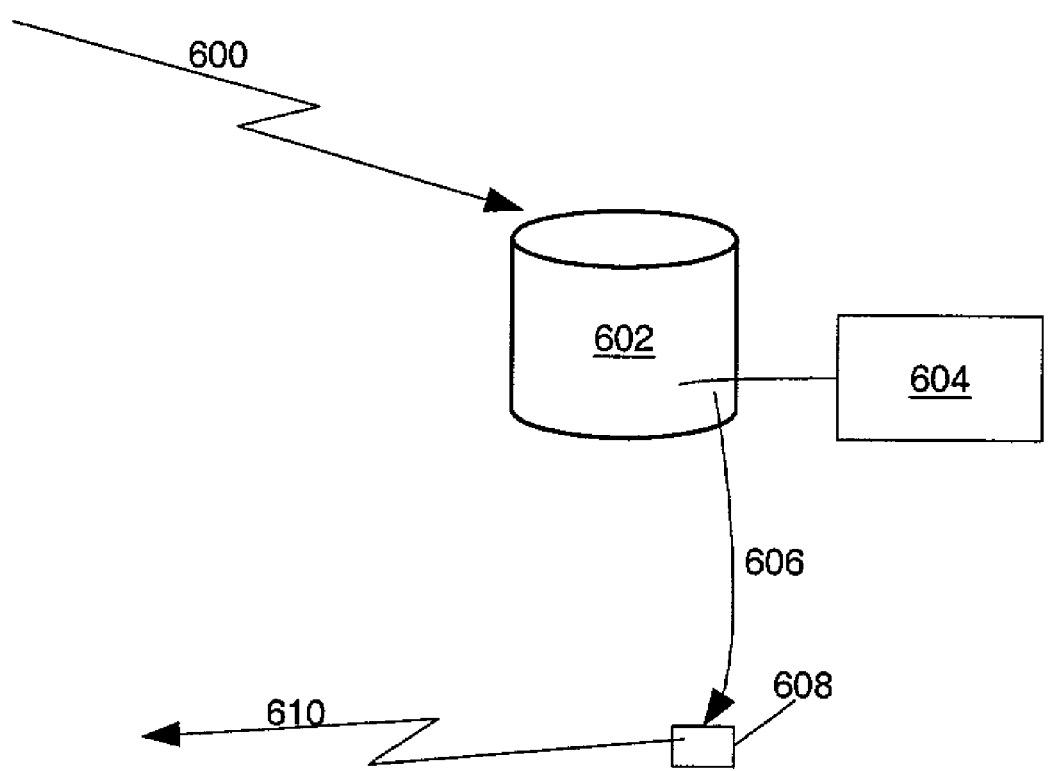
FIG. 6 shows an example of a method for implementing an EPG in accordance with another embodiment of the invention.

FIG. 6 of the drawings shows another embodiment of the present invention method for implementing an EPG. Referring to FIG. 6, an incoming EPG data stream is received by an EPG system in accordance with one embodiment of the invention and stored in its entirety in a database within memory storage area 602. Process 604 then cyclically goes through the records within the database in memory storage area 602 and recognizes gaps in the database. This is possible because the required range is known i.e. the next 2 days etc. After determining what data is missing, information about the missing data is sent by arrow 606 to process 608 which from time to time sends a request 610 to the headend to transmit the missing data. The frequency of requests from process 608 can be interval-based, poll-based, or based on the number of missing data requests. Thus, only the missing data is received as requested. No filtration or selection of the received data is required.

Figure 7:
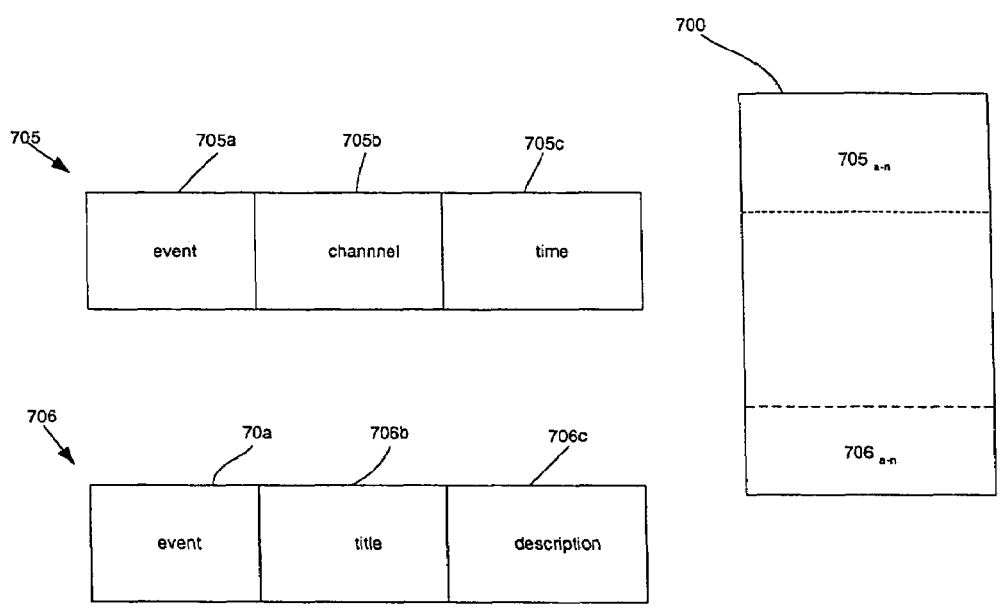
FIG. 7 shows EPG records in accordance with the prior art.

FIG. 7 shows an instance according to prior art. Memory 700 is filled from the top with elements of a record of type 705, and from the bottom with elements of a record of type 706. Record 705 essentially contains the event, the channel, and the time; and record 706 contains the event, the title, and the description. Out of multiple 705s and one 706, or out of multiple 706s, complete EPGs may be assembled.

Figure 8:
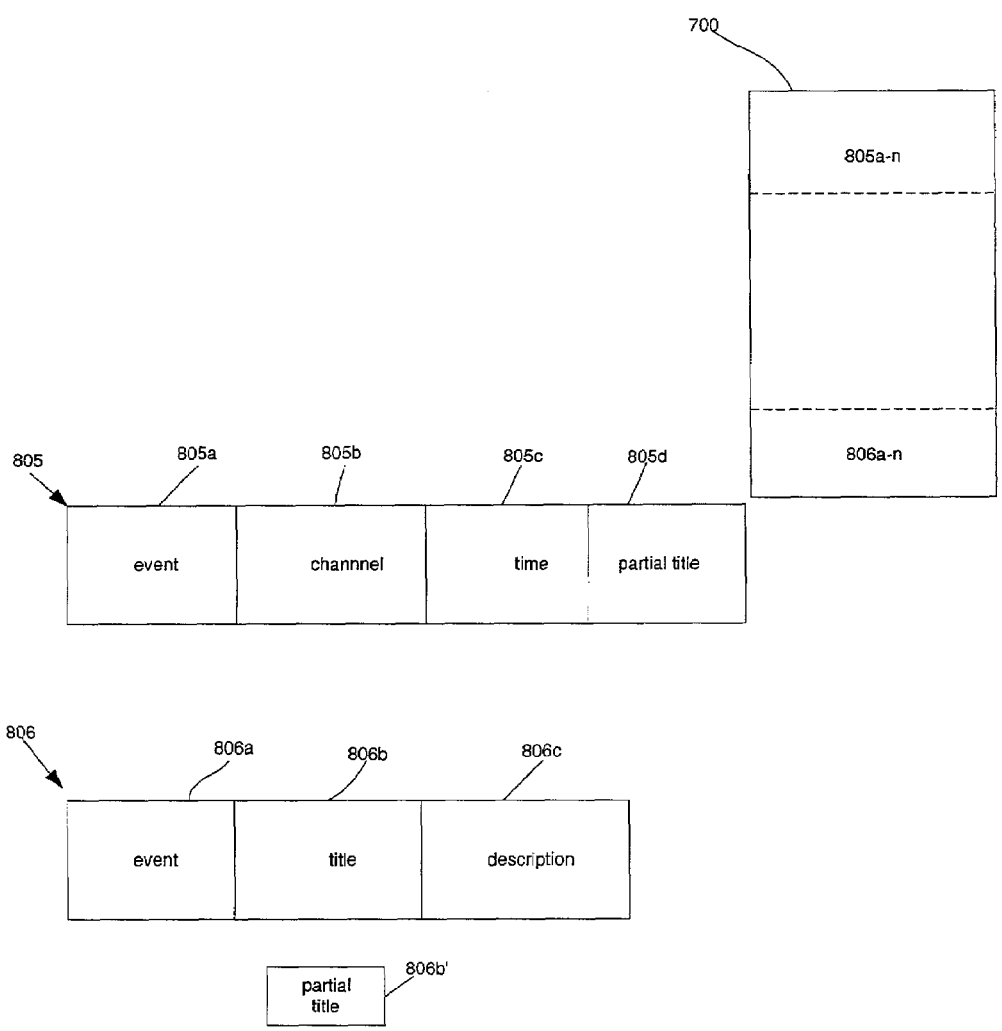
FIG. 8 shows EPG records in accordance with one embodiment of the invention.

FIG. 8 shows one embodiment according to the novel art of the present disclosure. Record 705 has been modified to become, in this example, record 805. Instead of containing just the event, the channel, and the time, it now contains an additional field 805d, which contains a partial title. Accordingly, in element 806 the title field 806b may now be replaced by field 806b'; which also contains a partial title, so that the two fields 805d and 806b', combined, yield a complete title.

Different approaches can be taken in partitioning the title. One approach, for example, takes the first one or two words of the title. Yet another approach would be to take, for example, the first five or ten characters of the title, regardless of how the words are broken. The resulting split of the title, by either approach, would allow very access to a partial title, which in many cases would be sufficient for the user to grasp the actual name of the show. In the partial title, for example, the first displayed characters may be followed by dots (e.g., and ellipsis). As the database engine retrieves the matching record 806 out of memory 700, it updates the display and replaces the dots with the full set of characters of the title.

This novel method would allow, when surfing channels to deliver very quickly a minimal set of information, because the engine does not have to search record 806 unless the user remains on the current selection for a certain period. After a certain period, then the engine searches for the complete title. If the user decides to flick to the next channel before the end of the period for displaying only the partial title, record 806 is not retrieved at all, and so only the partial title, with no description, is displayed.

Figure 9:
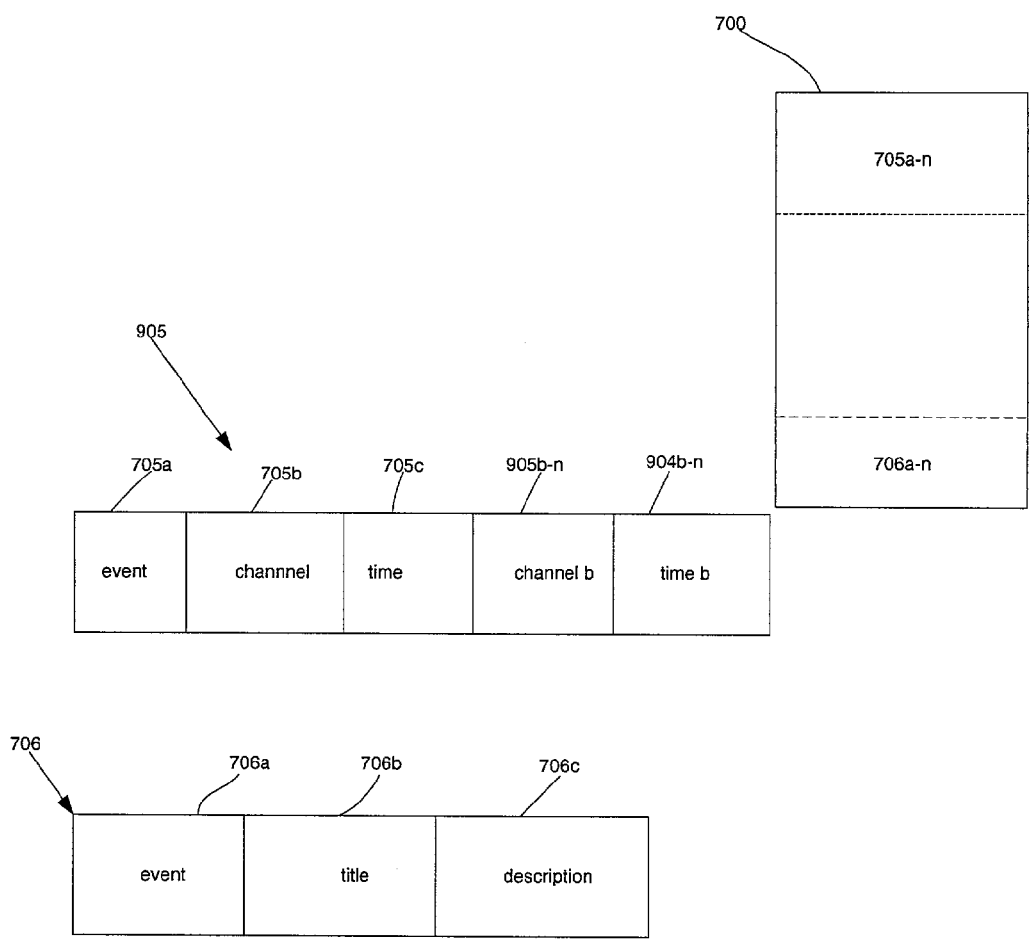
FIG. 9 shows another embodiment of EPG records in accordance with the invention.

FIG. 9 shows an instance similar to FIG. 8. However, now the event has not just one presentation time, but multiple presentation times and on multiple channels. Accordingly, bar 905 contains additional elements 905b–n and 904b–n.

Figure 10:
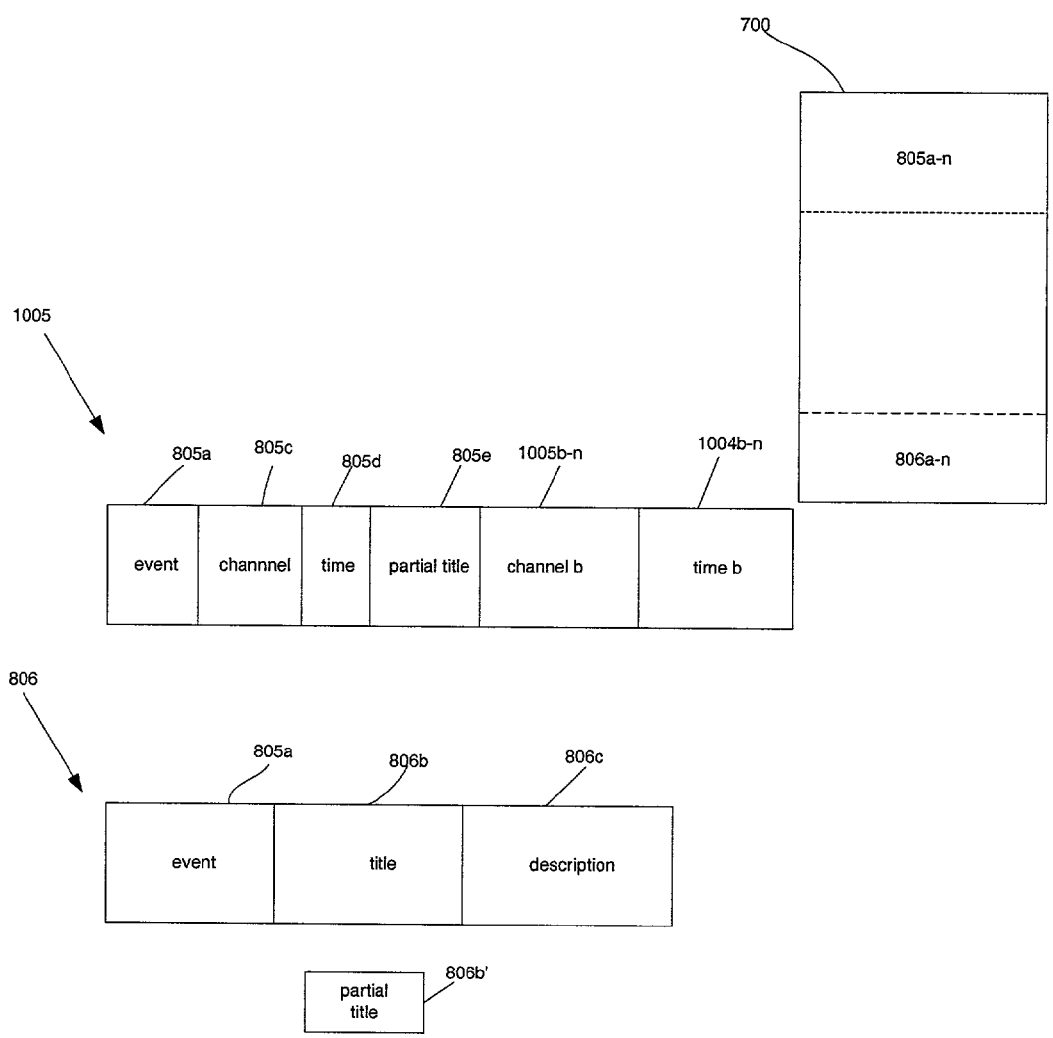
FIG. 10 shows yet another embodiment of EPG records in accordance with the invention.

FIG. 10 shows an enhanced bar 1005, similar to the enhanced bar 905 of Figure However, bar 1005 that has now a partial title 806b', plus the additional show times and channel assignments 1005b–n and 1004b–n. By using such a display, it is possible for the user to flip very quickly through events and display a partial title. Because in this example the title 1005b–n may be compressed, repetitive instances of a partial title may actually reduce memory usage dramatically in size, and therefore there may not be any real noticeable overall increase, or dramatic increase, of memory usage for partial titles.

It is clear that other variations can be made, without departing from the spirit of the novel art of this disclosure. As mentioned earlier, various criteria may be used as the basis for partitioning the title. And in some cases, for purposes of optimization of usability, the criteria for minimal memory usage may become intertwined inherently with the data compression, and dynamic rules may apply; that is, in some cases, for example, partitioning may be done strictly by length (i.e., number of characters) and in other cases done on a word-by-word basis.

Figure 11:
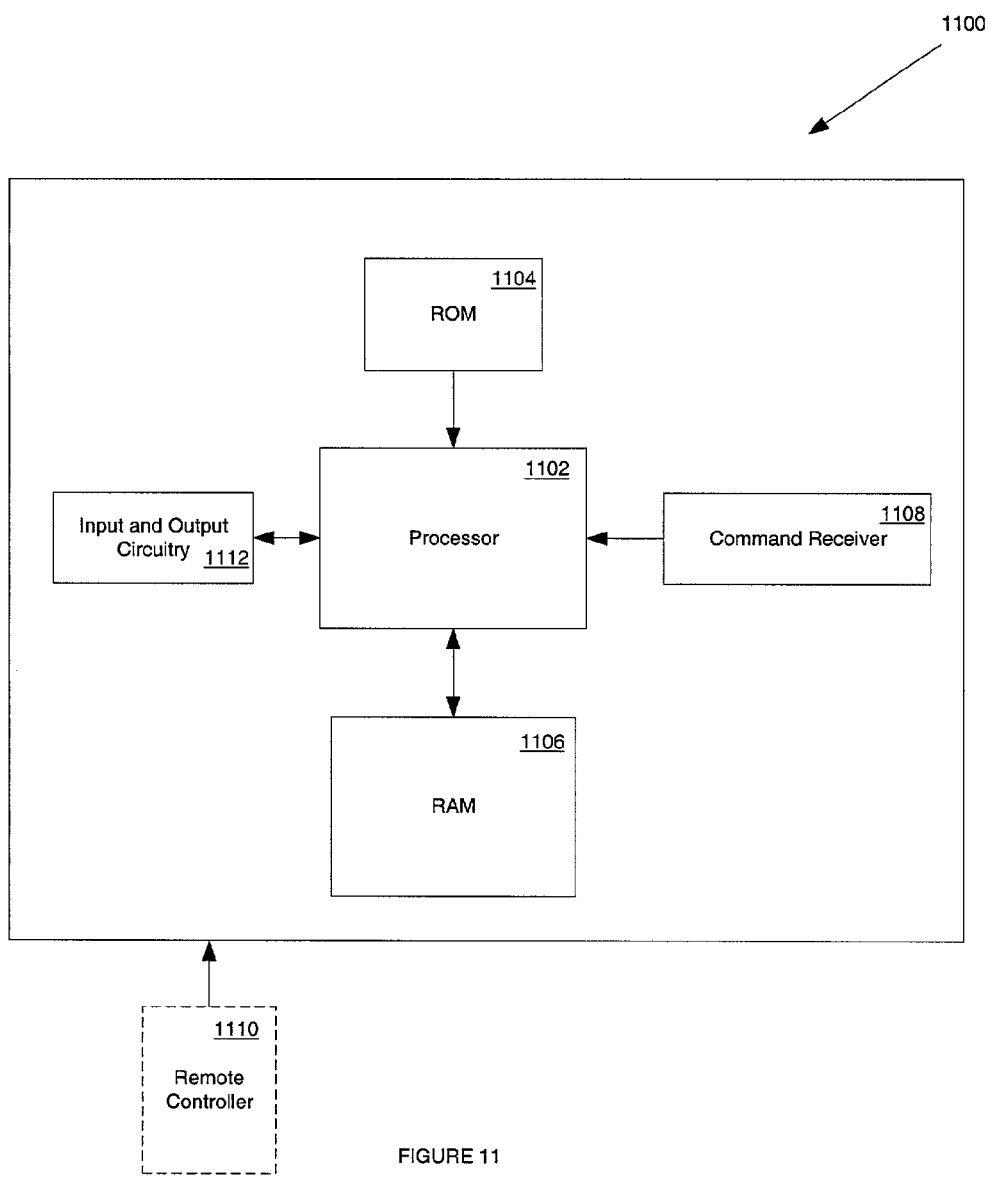
FIG. 11 shows a block diagram of an EPG system in accordance with one embodiment of the invention.

FIG. 11 of the drawings shows a block diagram of an EPG system 1100 in accordance with one embodiment of the invention. The system includes a processor 1102 and a read-only memory storage 1104 which stores a sequence of instructions which when executed by a processor 1102 causes processor 1102 to perform a method for implementing an EPG as described. The components of system 1100 include a random access memory 1106 wherein a database storing programming information as described above is stored. A command receiver 1108 is coupled to processor 1102 and includes circuitry to receive user input commands to control operation of system 1100. Such user input commands are typically input via a remote controller 1110. System 1100 also includes input and output circuitry 1112 which is coupled to processor 1102, via which programming information from a headend may be received. The circuitry 1112 is also used to send a request such as the request indicated by reference numeral 606 in FIG. 6 of the drawings to a headend, requesting missing information. The design and integration of blocks 1102, 1104, 1106, 1108 and 1112 are well known and are therefore not further described.

In the foregoing, the present invention has been described with reference to specific exemplary embodiments thereof. It will, however, be evident that various modifications and changes may be made thereto without departing from the broader spirit and scope of the present invention. In particular, the separate blocks of the various block diagrams represent functional blocks of methods or apparatuses and are not necessarily indicative of physical or logical separations or of an order of operation inherent in the spirit and scope of the present invention. The present specification and figures are accordingly to be regarded as illustrative rather than restrictive.

Although the present invention has been described with reference to specific exemplary embodiments, it will be evident that the various modifications and changes can be made to these embodiments without departing from the broader spirit of the invention as set forth in the claims. Accordingly, the specification and drawings are to be regarded in an illustrative sense rather than in a restrictive sense.

What is claimed is:

1. A method for storing program information in a memory associated with an electronic program guide system, the method comprising:
    partitioning the memory into two areas, wherein a first of said areas is structured to hold records of a first type, each comprising a first subset of information about a program including a partial title therefor, and wherein a second of said areas is structured to hold records of a second type, each comprising a second subset of information about the program;
    and linking records of the first and second type through a common field.

2. The method of claim 1, wherein the partial title comprises a selection of words from a complete title for the program.

3. The method of claim 1, wherein the partial title comprises a predetermined number of characters comprising a beginning of a complete title for the program.

4. The method of claim 1, wherein the second subset of information comprises a complementary title for the program which when combined with the partial title provides a complete title for the program.

5. The method of claim 1, further comprising displaying records of the first type to a user on a display associated with the electronic program guide system; and allowing the user to browse through the records.

6. The method of claim 5, wherein displaying the records of the first type further comprises displaying an indicator to indicate that a program title being displayed is a partial title.

7. The method of claim 5, further comprising dynamically combining information from records of the first and second type upon an occurrence of a predetermined event.

8. The method of claim 7, wherein the predetermined event comprises an effluxion of a predetermined time during which a partial title is displayed.

9. The method of claim 1, wherein the first subset of information comprises at least one channel and time pair associated with the program indicating, respectively, the channel and time on which the program is aired.

10. A method for manipulating electronic program guide data, the method comprising:
    partitioning the electronic guide data into pairs of records each comprising a first record type and a second record type, wherein each record of the first record type comprises a first subset of information about a program including a partial title therefor, and wherein each record of the second record type comprises a second subset of information about the program; and
    transmitting the partitioned electronic program guide data to an electronic program guide receiver system.

11. The method of claim 10, wherein partitioning the electronic program guide data comprises generating the partial titles for each program in the electronic program guide data.

12. The method of claim 11, wherein generating the partial titles comprises composing the partial titles using a selection of words from complete titles for each program.

13. The method of claim 11, wherein generating the partial titles comprises selecting a predetermined number of characters comprising a beginning of complete titles for each program.

14. The method of claim 10, wherein for each pair of records, the second subset of information in the record of the second type comprises a complementary program title which when combined with the partial title from the record of the first type within the pair provides a complete title for the program.

15. A system for implementing an electronic program guide, the system comprising:
    a processor and a memory coupled thereto, the memory storing instructions which when executed by the processor cause the processor to perform a method comprising:
    partitioning the memory into two areas, wherein a first of said areas is structured to hold records of a first type, each comprising a first subset of information about a program including a partial title therefor, and wherein a second of said areas is structured to hold records of a second type, each comprising a second subset of information about the program; and
    linking records of the first and second type through a common field.

16. The system of claim 15, wherein the partial title comprises a selection of words from a complete tile for the program.

17. The system of claim 15, wherein the partial titles comprises a predetermined number of characters comprising a beginning of a complete title for the program.

18. The system of claim 15, wherein the second subset of information comprises a complementary title for the program which when combined with the partial title provides a complete title for the program.

19. The system of claim 15, wherein the method further comprises displaying records of the first type to a user on a display associated with the system; and
    allowing the user to browse through the records.

20. The system of claim 19, wherein displaying the record of the first type further comprises displaying an indicator to indicate that a program title being displayed is a partial title.

21. The system of claim 19, wherein the method further comprises dynamically combining information from records of the first and second type upon an occurrence of a predetermined event.

22. The system of claim 21, wherein the predetermined event comprises an effluxion of a predetermined time during which a partial title is displayed.

23. The system of claim 15, wherein the first subset of information comprises at least one channel and time pair associated with the program indicating, respectively, the channel and time on which the program is aired.

24. A system for manipulating electronic program guide data, the system comprising a processor coupled to a memory having stored therein a sequence of instructions which when executed by the processor cause the processor to perform a method comprising:

partitioning the electronic guide data into pairs of records each comprising a first record type and a second record type, wherein each record of the first record type comprises a first subset of information about a program including a partial title therefor, and wherein each record of the second record type comprises a second subset of information about the program; and transmitting the partitioned electronic program guide data to an electronic program guide receiver system.

25. The system of claim 24, wherein partitioning the electronic program guide data comprises generating the partial titles for each program in the electronic program guide data.

26. The system of claim 25, wherein generating the partial titles comprises composing the partial titles using a selection of words from complete titles for each program.

27. The system of claim 25, wherein generating a partial title comprises selecting a predetermined number of characters comprising a beginning of complete titles for each program.

28. The system of claim 24, wherein for each pair of records, the second subset of information in the record of the second type comprises a complementary program title which when combined with a partial title from the record of the first type within the pair, provide a complete title for the program.

29. A system for implementing an electronic program guide, the system comprising:

partitioning means for partitioning a memory into two areas, wherein a first of said areas is structured to hold records of a first type, each comprising a first subset of information about a program including a partial title therefor, and wherein a second of said areas is structured to hold records of a second type, each comprising a second subset of information about the program; and means for linking records of the first and second type through a common field.

30. The system of claim 29, wherein the partial title comprises a selection of words from a complete title for the program.

31. The system of claim 29, wherein the partial title comprises a predetermined number of characters comprising a beginning of a complete title for the program.

32. The system of claim 29, wherein the second subset of information comprises a complementary title for the program which when combined with the partial title provides a complete title for the program.

33. The system of claim 29, further comprising display means for displaying records of the first type to a user on a display associated with the system; and allowing the user to browse through the records.

34. The system of claim 33, wherein the display means displays an indicator to indicate that a program title being displayed is a partial title.

35. The system of claim 33, further comprising combining means for dynamically combining information from records of the first and second type upon an occurrence of a predetermined event.

36. The system of claim 35, wherein the predetermined event comprises an effluxion of a predetermined time during which a partial title is displayed.

37. The system of claim 29, wherein the first subset of information comprises at least one channel and time pair associated with the program indicating, respectively, the channel and time on which the program is aired.

* * * * *